(12) United States Patent
Tulyakov et al.

(10) Patent No.: US 9,392,187 B2
(45) Date of Patent: Jul. 12, 2016

(54) IMAGE GENERATING APPARATUS INCLUDING DIGITAL IRIS AND METHOD AND NON-TRANSITORY RECORDABLE MEDIUM

(71) Applicant: SAMSUNG ELECTRONICS CO., LTD., Suwon-si (KR)

(72) Inventors: Stepan Tulyakov, Suwon-si (KR); Tae-hee Lee, Seoul (KR); Hee-chul Han, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 58 days.

(21) Appl. No.: 14/326,720

(22) Filed: Jul. 9, 2014

(65) Prior Publication Data

US 2015/0015773 A1  Jan. 15, 2015

(30) Foreign Application Priority Data

Jul. 9, 2013  (KR) .................. 10-2013-0080480
Oct. 7, 2013  (KR) .................. 10-2013-0118965

(51) Int. Cl.
*H04N 5/225* (2006.01)
*H04N 5/238* (2006.01)
*H04N 5/228* (2006.01)

(52) U.S. Cl.
CPC ............. *H04N 5/238* (2013.01); *H04N 5/2254* (2013.01)

(58) Field of Classification Search
CPC .............................. H04N 5/243; H04N 5/2254
USPC .................................. 348/222.1, 229.1, 340
See application file for complete search history.

(56) References Cited

U.S. PATENT DOCUMENTS

| | | | |
|---|---|---|---|
| 709,955 | A | 9/1902 | Bailey |
| 4,431,288 | A | 2/1984 | Iwata et al. |
| 4,826,301 | A | 5/1989 | Ikemori |
| 5,841,590 | A | 11/1998 | Sato |
| 7,058,252 | B2 | 6/2006 | Woodgate et al. |
| 7,215,475 | B2 | 5/2007 | Woodgate et al. |
| 7,605,857 | B2 | 10/2009 | Kim |
| 7,760,430 | B2 | 7/2010 | Shestak et al. |
| 7,986,374 | B2 | 7/2011 | Ijzerman et al. |
| 8,054,329 | B2 | 11/2011 | Shestak et al. |

(Continued)

FOREIGN PATENT DOCUMENTS

| | | |
|---|---|---|
| EP | 1 372 026 A2 | 12/2003 |
| JP | 8-111800 A | 4/1996 |

(Continued)

OTHER PUBLICATIONS

David E. Roberts et al., "The History of Integral Print Methods", Lens Array Print Techniques, pp. 1-21.

(Continued)

*Primary Examiner* — Kelly L Jerabek
(74) *Attorney, Agent, or Firm* — Sughrue Mion, PLLC

(57) ABSTRACT

An image generating apparatus and method are provided. The image generating apparatus includes: a main lens; a microlens array configured to transmit light that is incident on and received from the main lens; an image sensor configured to sense the light received from the microlens array according to a direction; and a digital iris configured to selectively assign, according to the direction of the light, a weight to a light sensing value of the light that is sensed by the image sensor.

23 Claims, 14 Drawing Sheets

(56) References Cited

U.S. PATENT DOCUMENTS

| | | | |
|---|---|---|---|
| 8,228,417 B1* | 7/2012 | Georgiev | G03B 11/00 348/335 |
| 2003/0071271 A1 | 4/2003 | Suzuki et al. | |
| 2003/0179457 A1 | 9/2003 | Dobashi et al. | |
| 2006/0170810 A1 | 8/2006 | Kim | |
| 2006/0239170 A1 | 10/2006 | Hashimoto | |
| 2007/0296851 A1 | 12/2007 | Yamazaki et al. | |
| 2008/0204872 A1 | 8/2008 | Ijzerman et al. | |
| 2008/0266388 A1 | 10/2008 | Woodgate et al. | |
| 2009/0102956 A1* | 4/2009 | Georgiev | H04N 5/23212 348/315 |
| 2009/0128669 A1* | 5/2009 | Ng | G02B 3/0056 348/241 |
| 2009/0316014 A1 | 12/2009 | Lim et al. | |
| 2010/0026852 A1 | 2/2010 | Ng et al. | |
| 2010/0066812 A1 | 3/2010 | Kajihara et al. | |
| 2010/0283863 A1* | 11/2010 | Yamamoto | G02B 27/0075 348/222.1 |
| 2011/0229117 A1 | 9/2011 | Hirai | |
| 2011/0280475 A1 | 11/2011 | Singhal et al. | |
| 2012/0019733 A1 | 1/2012 | Kim et al. | |
| 2013/0063571 A1* | 3/2013 | Ishii | G06T 15/205 348/47 |
| 2014/0049663 A1* | 2/2014 | Ng | G02B 27/0075 348/222.1 |

FOREIGN PATENT DOCUMENTS

| | | |
|---|---|---|
| JP | 4973228 B2 | 7/2012 |
| KR | 10-2006-0071035 A | 6/2006 |
| KR | 10-2006-0088996 A | 8/2006 |

OTHER PUBLICATIONS

Raytrix GmbH, Germany, "Raytrix Lightfield Camera", Raytrix Lightfield Camera, 2012, 35 pgs. total.

Ren Ng, "Digital Light Field Photography", A Dissertation, Jul. 2006, 203 pgs. total.

Edward H. Adelson et al., "Single Lens Stereo with a Plenoptic Camera", IEEE Transactions on Pattern Analysis and Machine Intelligence, Feb. 1992, vol. 14, No. 2, pp. 99-106.

Paul May "A Survey of 3D Display Technologies", Commercial Director, Ocuity Ltd., A Survey of 3D Display Technologies, Apr. 2005, pp. 1-8.

Andrew K. Kirby et al., "Adaptive lenses based on polarization modulation", University of Durham, Rochester Building, Dept. of Physics, Durham, DH1 3LE, UK, 5 pgs. total.

Jonathan Harrold et al., "Autostereoscopic display technology for mobile 3DTV applications", Society of Photo-Optical Instrumentation Engineers, 2007, pp. 1-12.

Adrian Jacobs et al., "2D/3D Switchable Displays", Apr. 2006, pp. 15-18.

Viktor Gruev et al., "Advances in Integrated Polarization Image Sensors", IEEE/NIH Life Science Systems and Applications Workshop, 2009, pp. 62-65.

Christian Perwaβ et al., "Single Lens 3D-Camera with Extended Depth-of-Field", Raytrix GmbH, 15 pgs. total.

Search Report dated Nov. 18, 2014 issued by the International Searching Authority in International Application No. PCT/KR2014/006154 (PCT/ISA/210).

Written Opinion dated Nov. 18, 2014 issued by the International Searching Authority in International Application No. PCT/KR2014/006154 (PCT/ISA/237).

* cited by examiner (x, y) - spatial coordinates;
(u, v) - angular coordinates;

(a)

Ideal bokeh of
this lens (b)

Bokeh of
conventional cam.

(a)

(b)

IMAGE GENERATING APPARATUS INCLUDING DIGITAL IRIS AND METHOD AND NON-TRANSITORY RECORDABLE MEDIUM

CROSS-REFERENCE TO RELATED APPLICATIONS

This application claims priority from Korean Patent Application No. 10-2013-0080480, filed on Jul. 9, 2013 in the Korean Intellectual Property Office, and Korean Patent Application No. 10-2013-0118965, filed on Oct. 7, 2013 in the Korean Intellectual Property Office, the disclosures of which are incorporated herein by reference in their entireties.

BACKGROUND

1. Field

Apparatuses and methods consistent with exemplary embodiments relate to an image generating apparatus, and more particularly, to an image generating apparatus including a microlens, an image generating method using the microlens, and a non-transitory recordable medium in which the image generating method is recorded.

2. Description of the Related Art

FIG. 1 is an exploded view illustrating a main configuration of a related art camera.

As illustrated in FIG. 1, a related art camera includes an image sensor 10, a shutter 20, an iris 30, and a lens 40. The image sensor 10 accumulates light transmitted through the lens 40 and outputs an electric signal, and the shutter 20 adjusts a period of time in which light enters the camera. An amount of light accumulated in an exposed pixel of the image sensor 10 is determined according to shutter speed.

The iris 30 is configured to adjust an amount of light incident into the camera through the lens 40. The iris 30 has a mechanical structure configured to gradually increase or reduce a size of an opening to adjust an amount of incident light. The iris may indicate a degree of opening as a numerical aperture called an F value. In this case, the smaller the numerical aperture is, the larger the opening size such that an amount of incident light is increased to generate a bright image.

Since a depth or brightness of a captured image is determined according to a degree of opening of the iris 30, the configuration of the iris 30 is important for capturing a high quality image in the related art camera.

However, since the iris 30 has a precise mechanical design, thus increasing the difficulty in developing a camera, the potential for defects in the camera, the cost of the camera, and the size of the camera. Therefore, there is a need for technology for replacing the iris 30 in a digital camera.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide an image generating apparatus including a technical configuration capable of replacing an iris, an image generating method, and a non-transitory recordable medium in which the image generating method is recorded.

According to an aspect of an exemplary embodiment, there is provided an image generating apparatus including: a main lens; a microlens array configured to transmit light that is incident on and received from the main lens; an image sensor configured to sense the light received from the microlens array according to a direction; and a digital iris configured to selectively assign, according to the direction of the light, a weight to a light sensing value of the light that is sensed by the image sensor.

The microlens array may transmit all reflected light with respect to one point of a subject, and the image sensor may sense the light of the direction among all the reflected light with respect to the one point of the subject.

The image sensor may include a plurality of pixel regions, and the plurality of pixel regions may sense light of different directions received from the microlens array.

The digital iris may convert the light sensing value of the light to a value corresponding to a black image signal to provide a blocking effect of the light of the direction with respect to the light sensing value.

The light sensing value to which the weight is selectively assigned may be in accordance with:

$$I(x_k) = \sum_m w_m r(x_k, \alpha_m),$$

where $I(x_k)$ is the light sensing value of the light to which the weight is selectively assigned, $r(x_k, \alpha_m)$ is the light sensing value sensed in the image sensor by the light incident on a microlens $x_k$ from a preset direction $\alpha_m$, $x_k$ is a two dimensional (2D) coordinate with respect to the microlens, $\alpha_m$ is the direction of the incident light, and $w_m$ is the weight representing an adjustment effect of an amount of the light incident according to the direction.

The image generating apparatus may not include a mechanical iris.

The image generating apparatus may be at least one of a digital camera, a smart phone, a tablet personal computer (PC), a laptop computer, smart glasses, a smart watch, and a medical imaging device.

According to an aspect of another exemplary embodiment, there is provided a method of generating an image, the method including: sensing light of a direction among light sequentially received from a main lens and a microlens array through an image sensor; and selectively assigning a weight to a light sensing value of the light that is sensed by the image sensor.

The microlens array may transmit all reflected light with respect to one point of a subject, and the image sensor may sense the light of the direction among all the reflected light with respect to the one point of the subject.

The image sensor may include a plurality of pixel regions, and the plurality of pixel regions may sense light of different directions.

The selectively assigning the weight may include converting the light sensing value of the light to a value corresponding to a black image signal to provide a blocking effect of the light of the direction with respect to the light sensing value.

The light sensing value to which the weight is selectively assigned may be in accordance with:

$$I(x_k) = \sum_m w_m r(x_k, \alpha_m),$$

where $I(x_k)$ is the light sensing value of the light to which the weight is selectively assigned, $r(x_k, \alpha_m)$ is the light sensing value sensed in the image sensor by the light incident on a microlens $x_k$ from a preset direction $a_m$, $x_k$ is a two dimensional (2D) coordinate with respect to the microlens, $a_m$ is the direction of the incident light, and $w_m$ is the weight representing an adjustment effect of an amount of the light incident according to the direction.

According to an aspect of another exemplary embodiment, there is provided a non-transitory recordable medium in which a program for performing the image generating method is recorded.

The non-transitory recordable medium may be a complex instruction set computer (CISC) chip, a reduced instruction set computer (RISC) chip, or a bit slice microprocessor unit (MPU) chip.

According to an aspect of another exemplary embodiment, there is provided an image generating method for generating an image based on light that is received from a main lens and a microlens array according to a direction and sensed by an image sensor, the method including: obtaining a light sensing value of the light that is sensed by the image sensor; and selectively assigning a weight to the obtained light sensing value according to the direction of the light.

Aspects of one or more exemplary embodiments provide an image generating apparatus including a technical configuration capable of replacing an iris, an image generating method, and a non-transitory recordable medium in which the image generating method is recorded.

Additional aspects and advantages of exemplary embodiments will be set forth in the detailed description, will be obvious from the detailed description, or may be learned by practicing exemplary embodiments.

BRIEF DESCRIPTION OF THE DRAWINGS

The above and/or other aspects will be more apparent from the following description of exemplary embodiments, with reference to the accompanying drawings, in which.

DETAILED DESCRIPTION OF EXEMPLARY EMBODIMENTS

Figure 1:
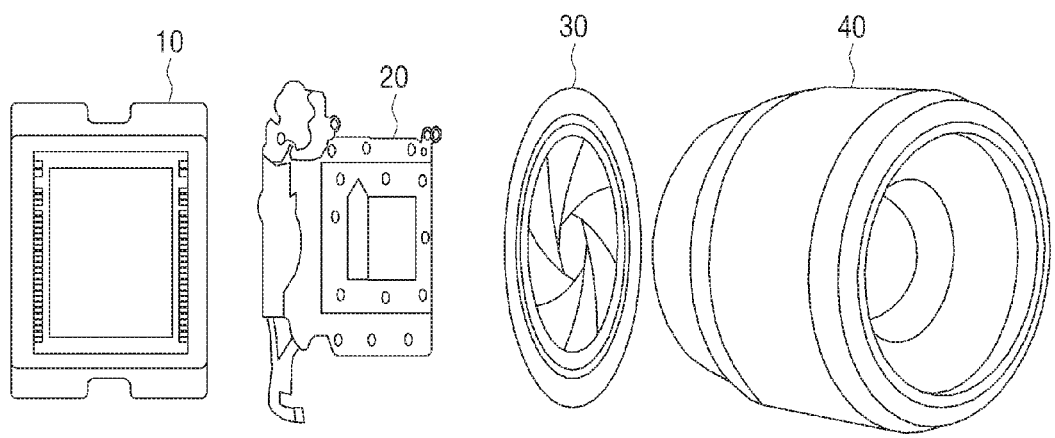
FIG. 1 is an exploded view illustrating a main configuration of a related art camera.

Hereinafter, exemplary embodiments will be described in more detail with reference to the accompanying drawings, in which exemplary embodiments are shown.

In the following description, the same reference numerals are used for the same or similar elements when they are depicted in different drawings. The matters defined in the description, such as detailed construction and elements, are provided to assist in a comprehensive understanding of exemplary embodiments. Thus, it is apparent that exemplary embodiments can be carried out without those specifically defined matters. Also, functions or elements known in the related art are not described in detail since they would obscure exemplary embodiments with unnecessary detail. Furthermore, it is understood that expressions such as "at least one of," when preceding a list of elements, modify the entire list of elements and do not modify the individual elements of the list.

Figure 2:
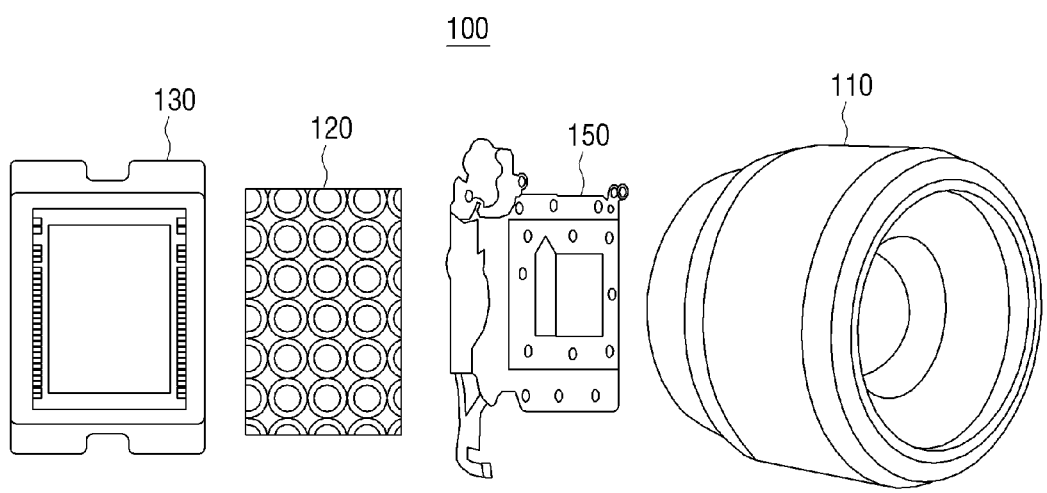
FIG. 2 is an exploded view illustrating a main configuration of an image generating apparatus according to an exemplary embodiment.

FIG. 2 is an exploded view illustrating a main configuration of an image generating apparatus 100 according to an exemplary embodiment. Referring to FIG. 2, an image generating apparatus 100 according to an exemplary embodiment includes a main lens 110, an image sensor 130, and a shutter 150. The image generating apparatus 100 further includes a plurality of microlenses (e.g., a microlens array 120). A light field camera technology including the microlens array 120 will now be described.

In recent years, integrated photography technology which includes a microlens array has been commercialized. A camera configured to generate an integrated photographic image is called a light field camera.

The light field camera generates rich 4-dimensional (4D) optical information to obtain various image effects based on one shooting. Since the 4D optical information may be obtained by combining two-dimensional (2D) optical information obtained through a main lens and 2D optical information obtained by transmitting (i.e., emitting) light through the microlens array to be integrated in an image sensor, the various image effects such as depth processing, digital refocusing, and spherical aberration correction may be obtained based on one shooting.

The image generating apparatus 100 according to an exemplary embodiment may be implemented by a light field camera which includes a microlens array 120. The image generating apparatus 100 according to an exemplary embodiment may provide an operation of an iris (i.e., mechanical aperture) of a related art camera without including or using the iris of the related art camera.

Figure 3:
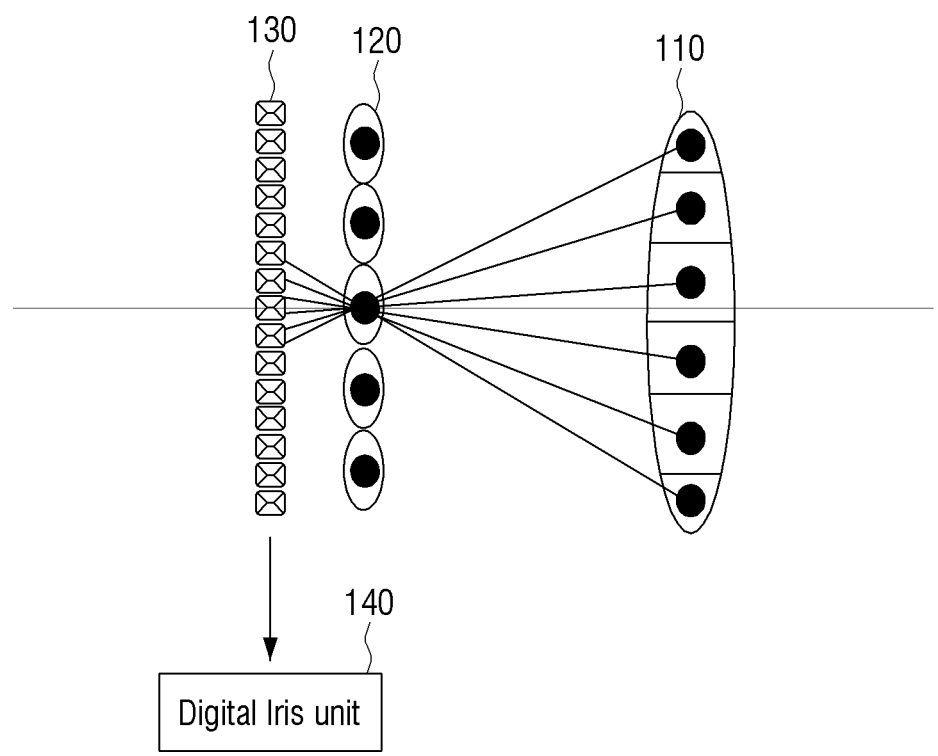
FIG. 3 is a schematic diagram illustrating a configuration and operation of an image generating apparatus according to an exemplary embodiment.

FIG. 3 is a schematic diagram illustrating a configuration and operation of an image generating apparatus 100 according to an exemplary embodiment.

Referring to FIG. 3, the image generating apparatus 100 according to an exemplary embodiment includes a main lens 110, a microlens array 120, an image sensor 130, and a digital iris 140 (i.e., a digital aperture).

The main lens 110 receives light reflected from a subject. The main lens 110 may be implemented by a general purpose lens or by a wide-angle lens. FIG. 3 illustrates a main lens 110 including one lens, although it is understood that one or more other exemplary embodiments are not limited thereto. For example, according to another exemplary embodiment, the main lens 110 may include a set of a plurality of lenses.

The microlens array 120 is configured to transmit incident light received from the main lens 110 to the image sensor 130. As illustrated in FIG. 3, the microlens array 120 may include a plurality of horizontally arranged microlenses. Each of the plurality of microlenses of the microlens array 120 individually retransmits the light received from the main lens 110. The retransmitted light is received by the image sensor 130.

The image generating apparatus 100 may further include a color filter. The color filter filters the light transmitted to the microlens array 120. Specifically, the color filter filters light of various colors, such as red, blue, green, cyan, magenta, yellow, white, and emerald. According to another exemplary embodiment, a surface of each of the microlenses may be coated with a color material layer without providing the color filter. Further, a substrate in which filters of different colors are formed in patterns corresponding to locations of the microlenses in the microlens array 120 may be disposed over the microlenses.

The image sensor 130 is configured to sense light received from the microlens array 120. In particular, the image sensor 130 senses a direction of the light received from the microlens array 120 and outputs a sensing value. The image sensor 130 may include a complementary metal oxide semiconductor (CMOS) image sensor or a charge coupled device (CCD). The image sensor 130 accumulates light through a photodiode PD of a pixel array and outputs an electrical signal according to an amount of accumulated light.

A pixel of the image sensor 130 may include a photodiode PD, a transfer transistor TX, a reset transistor RX, and a floating diffusion node FD. The photodiode PD generates photo charges corresponding to an optical image of a subject and accumulates the photo charges. The transfer transistor TX transfers the photo charges generated in the photodiode PD to the floating diffusion node FD in response to a transfer signal. The reset transistor discharges the charges stored in the floating diffusion node FD in response to a reset signal. Before the reset signal is applied, the charges stored in the floating diffusion node FD are output, and in a correlated double sampling (CDS) image sensor, CDS processing is performed. An analog-digital converter (ADC) converts a CDS-processed analog signal to a digital signal. While the above-described exemplary embodiment is with reference to an image sensor 130 implementing CDS, it is understood that one or more other exemplary embodiments are not limited thereto. For example, according to one or more other exemplary embodiments, the image sensor may implement pseudo-CDS, off-chip CDS, etc. Additionally, the pixels of the image sensor 130 may be 1T pixels, 2T pixels, 3T pixels, 4T pixels, 5T pixels, etc.

The image generating apparatus 100 may further include a controller configured to process the converted signal to generate an image. The controller may control an overall operation of the image generating apparatus 100, and may also perform an operation of the digital iris 140 to be described below according to an exemplary embodiment.

The controller includes at least one of a hardware configuration, such as a central processing unit (CPU) or a cache memory, and a software configuration such as an operating system or an application for performing a specific purpose. A control command for an operation with respect to each component which will be described below. The control command is read out from a memory according to a system clock, and an electrical signal is generated according to the read-out control signal to operate each component of the hardware configuration.

Incident light received by the main lens 110, which is reflected from a subject, is transmitted or passed to the microlens array 120, and the light transmitted through the microlens array 120 is sensed by the image sensor 130 to be output as an electrical signal. The light transmitted through the microlens array 120 is sensed in a sensing region of the image sensor 130. The sensing region may form one image (a first image), and the controller may generate a sub image (a second image) using the formed first image. The sensing region may include a plurality of pixels, and the first image may be formed by a plurality of sub regions representing at least one pixel. A plurality of first images may also be formed, and thus the controller may combine pixel values of the preset sub regions in each of the first images to generate the second image. The second image is formed so that the number of second images corresponds to the number of sub regions of the first image.

The digital iris 140 is configured to apply an iris effect (i.e., aperture effect) to an output value of the image sensor 130. In particular, the digital iris 140 selectively assigns a weighting factor to the light sensing value which is sensed by the image sensor 130 according to a direction of received light.

The operation of the digital iris 140 will be described in further detail with reference to FIGS. 4 to 6.

Figure 4:
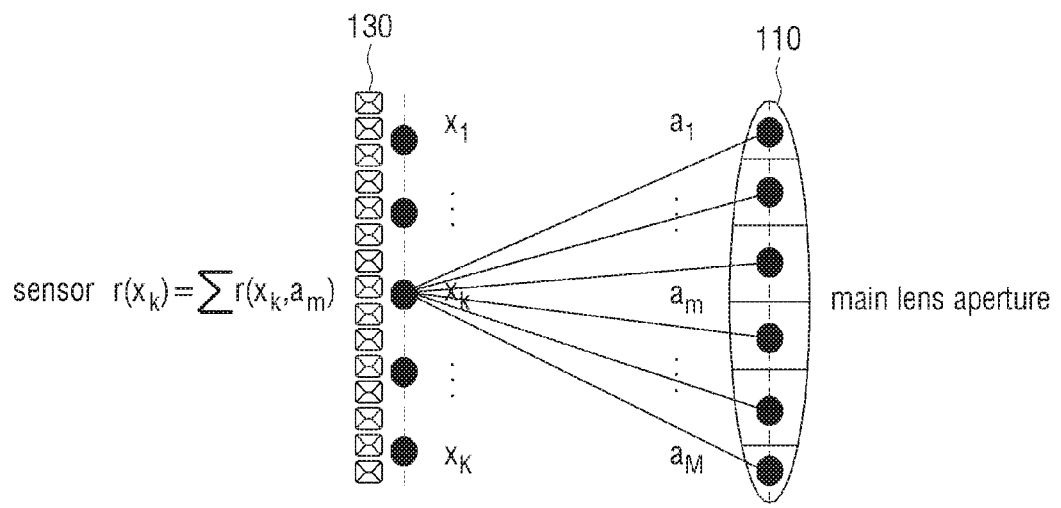
FIG. 4 is a view illustrating light accumulation of an image sensor in a related art camera.

FIG. 4 is a view illustrating light accumulation of an image sensor of a related art camera.

As illustrated in FIG. 4, in the related art camera, light received from a main lens 110 is transmitted to each pixel region of the image sensor 130 and accumulated. In a camera which does not include a mechanical aperture, light received from all regions of the main lens 110 is integrated into one pixel region $X_K$ of the image sensor 130. That is, light of all directions reflected from one point of a subject is integrated into one pixel region $X_K$. Since the image sensor 130 has a plane shape, the pixel region $X_K$ may be defined by 2D coordinates. However, since the pixel region $X_K$ includes information of all light reflected by a single point of the subject, the 2D coordinates may be referred to as spatial coordinates. When a mechanical aperture is not included in the related art camera, there is no element that is configured to adjust an amount of light using the sensing value of the image sensor 130.

Figure 5:
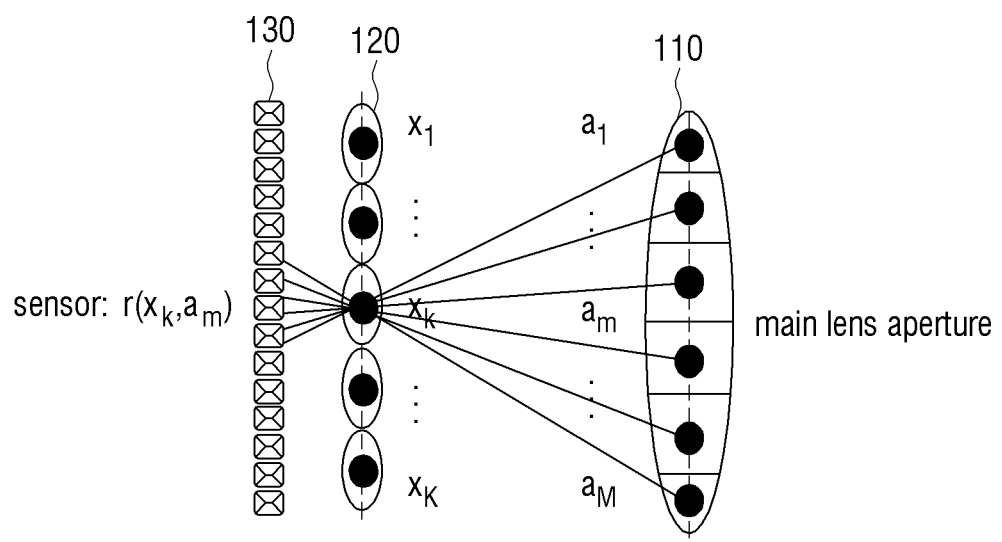
FIG. 5 is a view illustrating light accumulation of an image sensor according to an exemplary embodiment.

FIG. 5 is a view illustrating light accumulation of an image sensor 130 according to an exemplary embodiment.

As illustrated in FIG. 5, in the image generating apparatus 100 according to an exemplary embodiment, light transmitted through a main lens 110 is not directly incident to each pixel region of the image sensor 130 is first transmitted to a microlens array 120. Similar to the pixel region of the image sensor 130 in the related art camera, light of all directions reflected from one point of a subject is incident to one microlens of the microlens array 120. Therefore, a microlens array 120 including a plurality of microlenses may also be represented as 2D coordinates. Since the one microlens transmits all reflected light with respect to the one point of the subject, the 2D coordinates may be referred to as spatial coordinates.

According to an exemplary embodiment, light of all the directions reflected from the one point of the subject is transmitted through the microlens of the microlens array 120 to be integrated into a corresponding region of the image sensor 130. Unlike the related art camera, the light of all directions reflected from the one point of the subject is not integrated into a unit region of the image sensor 130, but only a portion of the light of all directions reflected from the one point of the subject is incident to the unit region of the image sensor 130. For example, assuming that light reflected from one point of a subject and incident to the main lens 110 is divided into m directions, and the light transmitted through a single microlens of the microlens array 120 is integrated into m divided regions of the image sensor 130, light of one direction is integrated into one divided region of the image sensor 130 according to an exemplary embodiment. As a result, the light transmitted through the main lens 110 is divided according to direction and integrated into a region of the image sensor 130 into which the light transmitted through the one microlens of the microlens array 120 is integrated. Thus, the region of the image sensor 130 may be represented as independent 2D coordinates. Since the 2D coordinates include direction information of the light, the 2D coordinates may be referred to as angular coordinates.

According to an exemplary embodiment, the image sensor 130 may individually sense information for the light of all the (divided) directions reflected from an object and incident to the main lens 110, and converts the information to an electrical signal. Each of the pixel regions in the image sensor 130 combines the above-described two 2D coordinates to represent information for the light of all the directions reflected from the subject. The coordinates may be referred to as spatio-angular coordinates.

Figure 6:
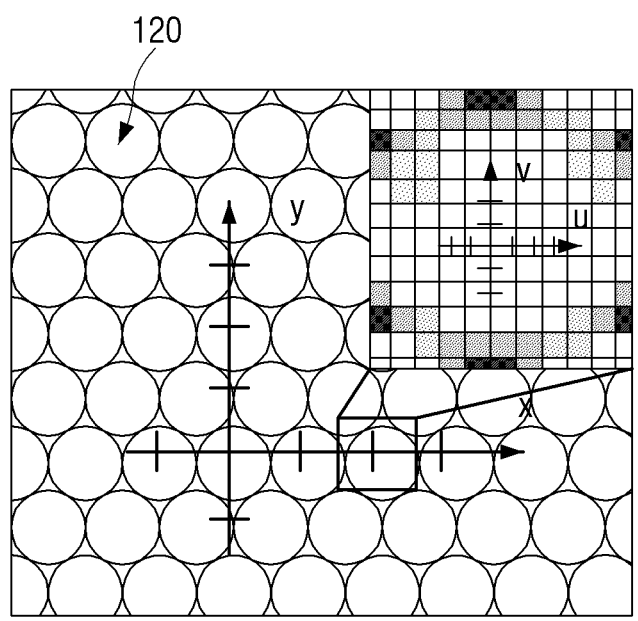
FIG. 6 is a view illustrating spatio-angle coordinates.

FIG. 6 is a view illustrating the spatio-angular coordinates. As shown in FIG. 6, 2D spatial coordinates may be defined on the basis of the a microlens of the microlens array 120, and 2D angular coordinates may be defined on the basis of a pixel region of the image sensor 130 that corresponds to the microlens of the microlens array 120. The spatio-angular coordinates in which the two coordinate systems are combined represent four-dimensional (4D) information.

The digital iris 140 provides an iris function by evaluating electrical signals output from each pixel region of the image sensor 130. The digital iris 140 selectively assigns a weighting factor to an output value of each pixel region. When the image sensor 130 senses the light received from the microlens array 120 corresponding to a direction of a portion of the light reflected from a point of the subject, the digital iris 140 selectively assigns a weighting factor to the light sensing value which corresponds to the direction.

Each of the plurality of pixel regions of the image sensor 130 may sense light of different directions received from the microlens array 120. The direction of the portions of the light reflected from points of the subject may vary.

The above-described process may be expressed by the following equation:

$$I(x_k) = \sum_m w_m r(x_k, \alpha_m)$$

$I(x_k)$ represents a sensing value of the image sensor 130 to which a weighting factor is assigned, $r(x_k, \alpha_m)$ represents a sensing value sensed in the image sensor representing light transmitted to a microlens $x_k$ from a preset direction $a_m$, $x_k$ represents 2D coordinates with respect to a single microlens, $a_m$ represents a direction of incident light, and $w_m$ represents a weighting factor to adjust an amount of light received from a particular direction.

A sensing value $I(x_k)$ to which the weighting factor of the image sensor 130 is assigned constitutes a value to which a weighting factor at an $x_k$ coordinate of a microlens is assigned. The light which is reflected from one point of a subject and incident to the main lens 110 is divided into portions representing m directions $a_1$ through $a_m$. The digital iris 140 generates an image to which an iris effect (i.e., aperture effect) is added by multiplying light sensing values which correspond to different directions by different weighting factors $w_m$ according to a specific purpose.

The image sensor 130 may include a plurality of pixel regions. The plurality of pixel regions sense light received from different directions.

In a light field camera, an F value of a main lens is the same as an F value of a microlens array. However, when the microlenses of the microlens array 120 have variable focus lengths, the digital iris 140 may also be implemented to be suitable for a zoom main lens.

Hereinafter, various exemplary embodiments for generating various iris effects by selectively assigning weighting factors to sensing values will be described.

Figure 7:
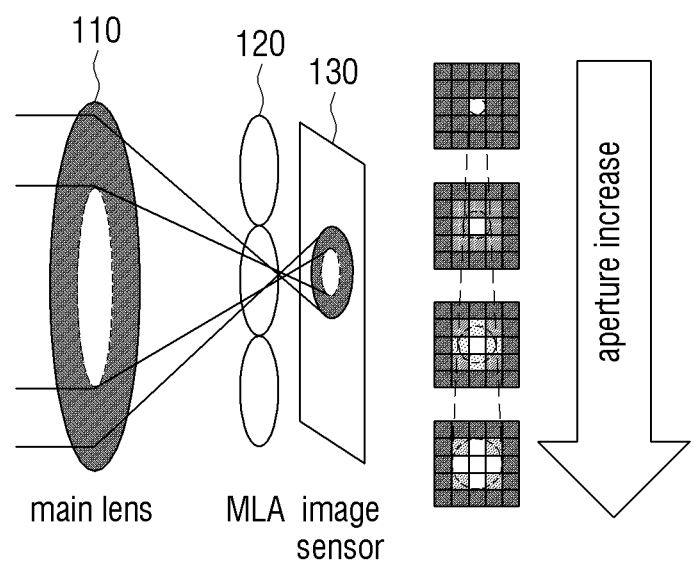
FIG. 7 is a schematic diagram illustrating an iris effect according to an exemplary embodiment.

FIG. 7 is a schematic diagram illustrating an operation of assigning a weighting factor to obtain a soft focus effect according to an exemplary embodiment.

The image generating apparatus 100 according to an exemplary embodiment is configured to generate an image having a soft-focus effect without a mechanical iris structure, as illustrated in FIG. 7.

The soft-focus effect refers to a special effect of generating a blurred image having a keen edge. Such an image is different from an out-focus image, and may not be obtained simply by de-focusing a lens in the related art. For example, the soft-focus effect may be used to hide skin blemishes or express a dreamlike atmosphere in a portrait and a nude picture. The soft-focus effect appears in a lens having an uncorrected spherical aberration. Due to the spherical aberration, a light transmitted from a periphery of the lens is focused closer than a light transmitted from a center of the lens, and may be expressed as a special Point Spread Function (PSF) i.e., a response of a lens to a point light source. The PSF has a bright area in the center of the lens, and has a dark area in the periphery of the lens. The bright area represents a keen edge of an image, and the dark area represents a blurred part of the image.

The correction of spherical aberration is performed for various lenses in the related art, although it is difficult to correct the spherical aberration impeccably. Hence, an unintended soft-focus effect may occur in the lenses. However, some manufacturers make a particular lens for the soft-focus effect. Such lenses utilize a more complicated optical design than standard designs of the lenses in the related art.

The image generating apparatus 100 according to an exemplary embodiment selectively assigns a weighting factor to a sensing value which is outputted from a pixel region of an image sensor and does not utilize a complicated optical design, thereby implementing an image generating apparatus 100 configured to generate an image having the aforementioned soft-focus effect.

The digital iris 140 may generate an image having the soft-focus by assigning a weight (i.e., weighting factor) to a light sensing value that varies according to the direction of the light corresponding to the light sensing value.

According to an exemplary embodiment, the digital iris 140 may assign a first weighting factor to a sensing value of an incident light which is received from an edge direction of the main lens, and may assign a second weighting factor to a sensing value of an incident light which is received from a center direction of the main lens. In this case, the first weighting factor is greater than the second weighting factor.

In addition, the digital iris 140 may assign the weighting factor so as to gradually increase sensing values from the sensing value of the incident light which is received from an edge direction of the main lens 110 to the sensing value of the incident light which is received from the center direction of the main lens 110.

In FIG. 7, the digital iris 140 provides a smooth iris effect. A related art camera is configured to change a degree of opening of an iris step by step. The related art camera causes a drastic change in a depth of field as a range recognized to be in a focus. Therefore, the related art camera is configured to control an iris and lenses to be changed step by step by a method provided by the manufacturer of the main lens.

According to an exemplary embodiment, the digital iris 140 may implement an iris effect smoothly opened and closed by selectively applying a weighting factor to a pixel region as illustrated in FIG. 7. When the weighting factor is applied, different weights may be applied to the plurality of pixel regions. That is, in the present exemplary embodiment, an iris effect can be more precisely controlled than an effect obtained by the mechanical iris of a related art camera.

FIGS. 8A, 8B, 9 and 10 are schematic diagrams illustrating an operation of assigning a weighting factor for a bokeh effect according to another exemplary embodiment.

Figure 8:
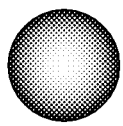
FIGS. 8A and 8B are schematic diagrams illustrating an iris effect according to another exemplary embodiment.
Figure 8:
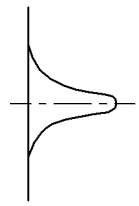
Figure 8:
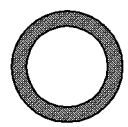
Figure 8:
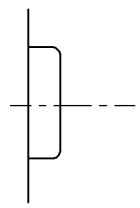

The image generating apparatus 100 according to another exemplary embodiment is configured to generate an image having a bokeh effect without a mechanical iris structure as illustrated in FIG. 8A.

Figure 9:
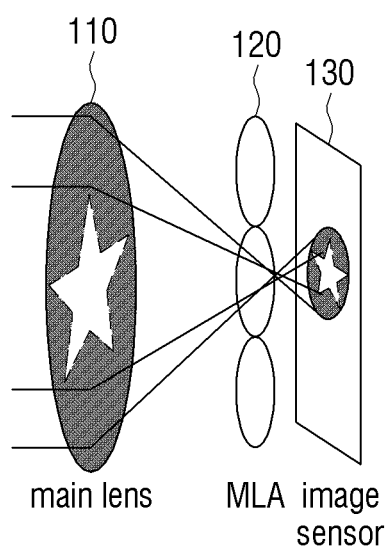
FIG. 9 is a schematic diagram illustrating an iris effect according to another exemplary embodiment.
Figure 10:
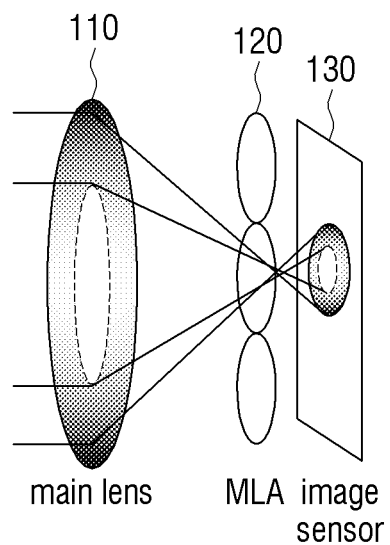
FIG. 10 is a schematic diagram illustrating an iris effect according to another exemplary embodiment.

The bokeh effect can be used to obtain an effect of blurring a light in a circular shape. Some users who wish to obtain a bokeh effect having a unique shape, i.e., other than a circular bokeh (such as illustrated in FIG. 9), cover a front part of the main lens with a mask.

The PSF of a lens in the related art shows a hat-shaped profile (FIG. 8B). Such a profile often represents an incorrect maximum value or minimum value thereby causing a distortion of a focus.

An ideal bokeh effect represents a Gaussian profile as illustrated in FIG. 8A. However, a related art camera is limited in implementing a complete bokeh effect.

The image generating apparatus 100 according to the present exemplary embodiment selectively assigns a weighting factor to a sensing value which is outputted from a pixel region of the image sensor without a complicated optical design, thereby implementing an image generating apparatus 100 configured to generate an image having an ideal bokeh effect as described above.

That is, the digital iris 140 may assign the weighting factor so as to gradually increase the sensing value from the sensing value of the incident light which is received from the edge direction of the main lens 110 to the sensing value of the incident light which is received from the center direction of the main lens 110. In addition, the digital iris 140 may assign a weighting factor so that the PSF forms a Gaussian bokeh.

The image generating apparatus 100 according to one or more exemplary embodiments may be provided in a general electronic computing apparatus or a digital camera. The image generating apparatus may include a hardware configuration, for example, a central processing unit (CPU) having a sufficient control and logic function, a cache memory, a random access memory (RAM), a high-capacity auxiliary storage device such as a hard disc or a blu-ray disc (BD), a near field communication module, various wired and wireless communication modules including a high-definition multimedia interface (HDMI), and a data bus. Furthermore, the image generating apparatus 100 may be implemented as an application stored on a non-transitory computer-readable medium to program a controller to perform the operations of the controller and the digital iris 140, a framework, and an operating system.

Further, the above-described image generating apparatus 100 may be implemented as various electronic apparatuses or may be included in configurations of various electronic apparatuses. That is, the image generating apparatus 100 may be implemented as a digital camera, a smart phone, a tablet personal computer (PC), a laptop computer, smart glasses, a smart watch, a medical imaging device, etc. The image generating apparatus 100 may be included in the above-described apparatuses as an image generating module.

In addition, the image generating apparatus 100 using the microlens array 120 may be implemented by methods other than the aforementioned method.

Figure 11:
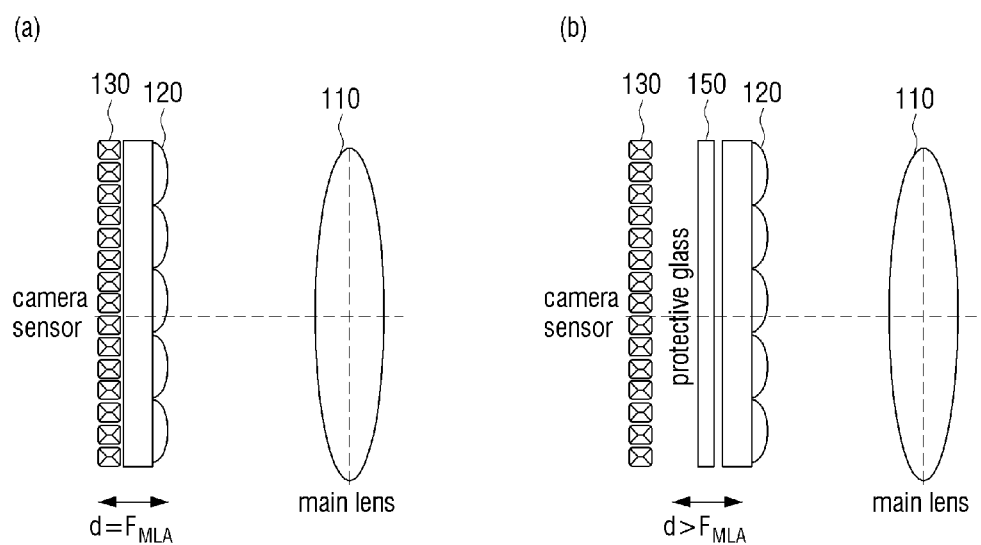
FIGS. 11A and 11B are views illustrating arrangements of a microlens array 120 according to various exemplary embodiments.

FIGS. 11A and 11B are views illustrating arrangements of a microlens array 120 according to various exemplary embodiments.

The microlens array 120 may be disposed at various distances from the image sensor 130. For example, according to an exemplary embodiment, the microlens array 120 may be directly attached to the image sensor 130, as shown in FIG. 11A. In this case, a focal distance ($F_{MLA}$) of the microlens is equal to a distance (d) between the microlens array 120 and the image sensor 130. According to another exemplary embodiment, the microlens array 120 may be disposed on a shutter 150, as shown in FIG. 11B. In this case, the focal distance ($F_{MLA}$) of the microlens is less than the distance (d) between the microlens array 120 and the image sensor 130. Additionally, according to an exemplary embodiment, a protective glass 180 may be included between the image sensor 130 and the microlens array 120

Figure 12:
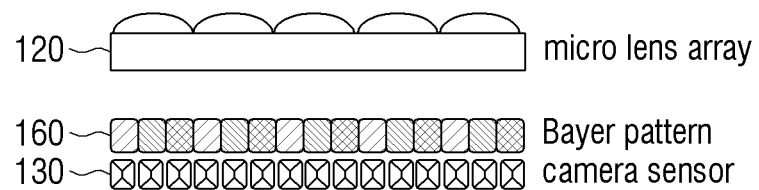
FIGS. 12A and 12B are views illustrating arrangements of a bayer pattern according to various exemplary embodiments.
Figure 12:
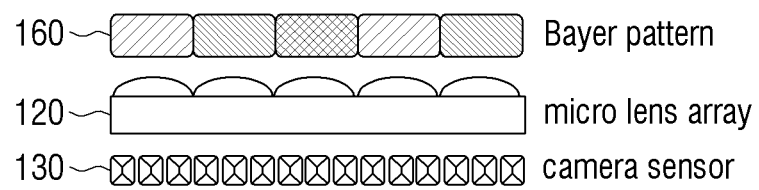

FIGS. 12A and 12B are views illustrating arrangements of a bayer pattern according to various exemplary embodiments.

According to an exemplary embodiment, a bayer pattern 160 is located on the image sensor 130, or is located between the image sensor 130 and the micro lens array 120, as shown in FIG. 12A. The bayer pattern 160 includes data patterns of red, green, and blue, and each color data corresponds to pixel data by being combined with each other.

According to another exemplary embodiment, the bayer pattern 160 may be implemented such that the bayer pattern 160, i.e., a color filter, is disposed in front of the microlens array 120, as shown in FIG. 12B, or such that the microlens array 120 is coated with the color filter. The image sensor 130 senses a monochrome image signal.

Although the data patterns of red, green, and blue are described as color data of the color filter above, it is understood that one or more other exemplary embodiments are not limited thereto. For example, according to one or more other exemplary embodiments, the color filter may filter light of various colors, such as red, blue, green, cyan, magenta, yellow, white, emerald, etc.

Hereinafter, image generating methods according to various exemplary embodiments will be described.

Figure 13:
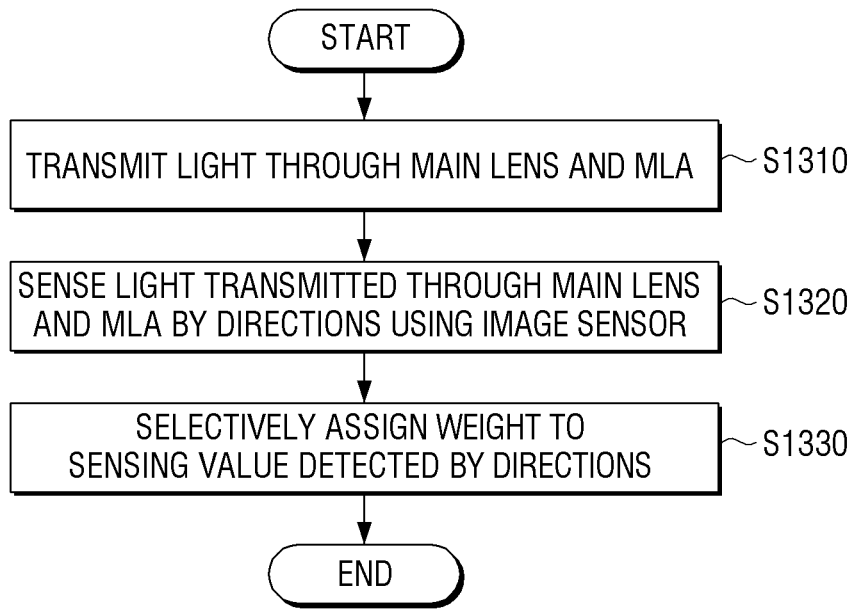
FIGS. 13 and 14 are flowcharts of image generating methods according to various exemplary embodiments.
Figure 14:
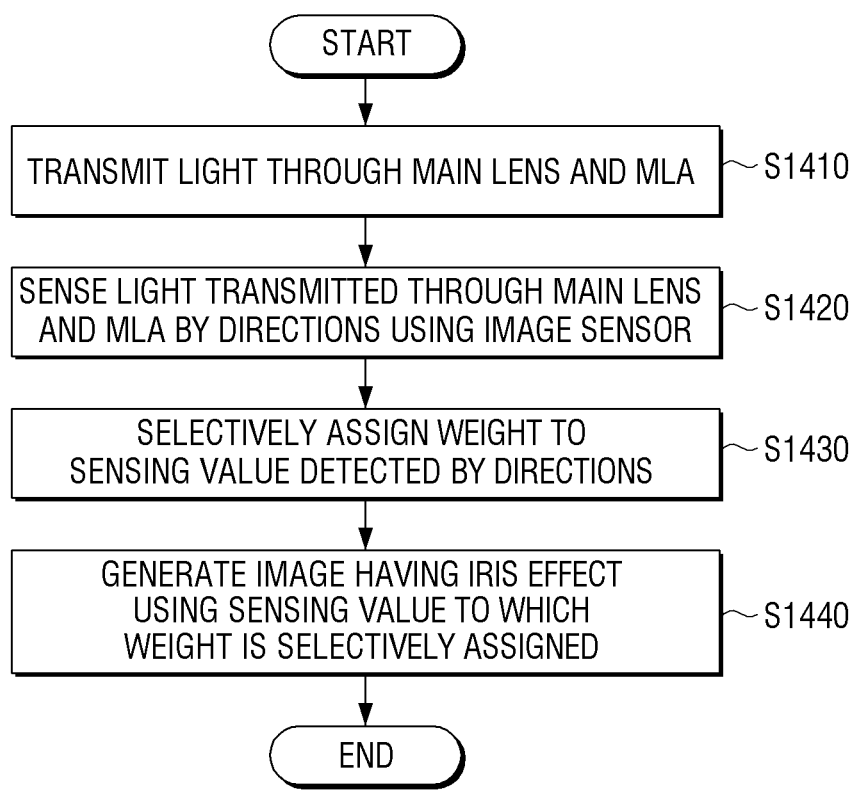

FIGS. 13 and 14 are flowcharts illustrating image generating method according to various exemplary embodiments.

Referring to FIG. 13, an image generating method according to an exemplary embodiment includes transmitting a light through a main lens and a microlens array (operation S1310), sensing the light transmitted through the main lens and the microlens array according to a direction by an image sensor (operation S1320), and selectively assigning a weight to a light sensing value which is sensed according to the direction by a digital iris (operation S1330).

In this case, the image sensor may include a plurality of pixel regions. In addition, the plurality of pixel regions may respectively sense light of different directions, which is transmitted through the micro lens array.

The sensing value to which a weight is selectively assigned may be expressed by the following equation:

$$I(x_k) = \sum_m w_m r(x_k, \alpha_m),$$

where $I(x_k)$ is a sensing value of the image sensor to which the weight is assigned, $r(x_k, \alpha_m)$ is a sensing value sensed in the image sensor by light incident to a micro lens $x_k$ from a preset direction $a_m$, $x_k$ is a 2D coordinate with respect to the microlens, $a_m$ is a direction of incident light, and $w_m$ is a weight representing an adjustment effect of an amount of light incident according to a direction.

The microlens array according to an exemplary embodiment may include a color filter which filters the light transmitting the main lens.

The digital iris may assign different weights (i.e., weighting factors) to different sensing values corresponds to different directions of incident light. For example, according to an exemplary embodiment, a first weight may be assigned to a sensing value of light that is incident from an edge direction of the main lens, and a second weight may be assigned to a sensing value of light that is incident from a center direction of the main lens. In this case, the first weight may be higher than the second weight.

Furthermore, according to an exemplary embodiment, the digital iris may assign weights so as to gradually increase from a sensing value of light that is incident from the edge direction of the main lens to a sensing value of light that is incident from the center direction of the main lens.

Additionally, the digital iris unit assign weights so that a PSF forms a Gaussian bokeh.

Referring to FIG. 14, an image generating method according to another exemplary embodiment includes transmitting a light through a main lens and a microlens array (operation S1410), sensing the light transmitted through the main lens and the microlens array according to a direction by an image sensor (operation S1420), selectively assigning a weight to a light sensing value which is sensed according to the direction (operation S1430) by the digital iris, and generating an image having an iris effect by using a sensing value to which a weight is selectively assigned (operation S1440).

A program code for performing the image generating methods according to the above-described various exemplary embodiments may be stored in a non-transitory computer-recordable medium. The non-transitory computer-recordable medium may be an apparatus-readable medium configured to semi-permanently store data. Specifically, the above-described various applications or programs may be stored and provided in the non-transitory apparatus-readable medium such as a compact disc (CD), a digital versatile disc (DVD), a hard disc, a Blu-ray disc, a universal serial bus (USB), a memory card, a ROM, a hard drive, and the like.

The image generating methods may be provided to any one among a complex instruction set computer (CISC) chip, a reduced instruction set computer (RISC) chip, and a bit slice microprocessor unit (MPU) chip in an embedded software or a firmware type.

The foregoing exemplary embodiments and advantages are merely exemplary and are not to be construed as limiting the present inventive concept. Exemplary embodiments can be readily applied to other types of devices. Also, the description of exemplary embodiments is intended to be illustrative, and not to limit the scope of the claims, and many alternatives, modifications, and variations will be apparent to those skilled in the art.

What is claimed is:

1. An image generating apparatus comprising:
   a main lens;
   a microlens array configured to transmit light that is incident on and received from the main lens;
   an image sensor configured to sense the light received from the microlens array according to a direction of the light; and
   a digital iris configured to selectively assign, according to the direction of the light, a weight to a light sensing value of the light that is sensed by the image sensor,
   wherein the light sensing value, according to the direction of the light, is sensed in the image sensor by light incident to a two-dimensional (2D) coordinate with respect to the microlens array from a predefined direction of the light incident to the 2D coordinate.

2. The apparatus as claimed in claim 1, wherein:
   the image sensor comprises a plurality of pixel regions; and
   the plurality of pixel regions are configured to respectively sense light of different directions, received from the microlens array.

3. The apparatus as claimed in claim 1, wherein the light sensing value to which the weight is selectively assigned is in accordance with:

$$I(x_k) = \sum_m w_m r(x_k, \alpha_m),$$

where $I(x_k)$ is the light sensing value of the image sensor to which the weight is selectively assigned, $r(x_k, \alpha_m)$ is the light sensing value sensed in the image sensor by light incident to a microlens $x_k$ from the direction $a_m$, $x_k$ is a two-dimensional (2D) coordinate with respect to the microlens, and $a_m$ is the direction of the incident light, and $W_m$ is the weight representing an adjustment effect of an amount of the light incident according to the direction.

4. The apparatus as claimed in claim 1, wherein the image generating apparatus does not comprise a mechanical iris.

5. The apparatus as claimed in claim 1, further comprising a color filter configured to filter the light that is incident on the main lens.

6. The apparatus as claimed in claim 5, wherein the color filter is between the microlens array and the camera sensor.

7. The apparatus as claimed in claim 1, wherein:
   the digital iris is configured to assign a first weight to a light sensing value of light that is incident on an edge of the main lens; and
   the digital iris is configured to assign a second weight, different from the first weight, to a light sensing value of light that is incident on a center of the main lens.

8. The apparatus as claimed in claim 7, wherein the first weight is greater than the second weight.

9. The apparatus as claimed in claim 1, wherein the digital iris is configured to assign weights so as to gradually increase from a light sensing value of light that is incident on an edge of the main lens to a light sensing value of light that is incident on a center of the main lens.

10. The apparatus as claimed in claim 9, wherein the digital iris is configured to assign the weights so that a Point Spread Function (PSF) forms a Gaussian bokeh.

11. The apparatus as claimed in claim 1, wherein the image generating apparatus is at least one of a digital camera, a smart phone, a tablet Personal Computer (PC), a laptop computer, a smart eyeglasses, a smart watch, and a medical imaging device.

12. The apparatus as claimed in claim 1, wherein the microlens array is directly attached to the image sensor.

13. An image generating method comprising:
receiving a light from a main lens and a microlens array;
sensing, by an image sensor, the light received from the main lens and the microlens array according to a direction of the light; and
selectively assigning, by a digital iris according to the direction of the light, a weight to a light sensing value of the light that is sensed by the image sensor,
wherein the light sensing value, according to the direction of the light, is sensed in the image sensor by light incident to a two-dimensional (2D) coordinate with respect to the microlens array from a predefined direction of the light incident to the 2D coordinate.

14. The method as claimed in claim 13, wherein:
the image sensor comprises a plurality of pixel regions; and
the plurality of pixel regions are configured to respectively sense light of different directions, received from the microlens array.

15. The method as claimed in claim 13, wherein the light sensing value to which the weight is selectively assigned is in accordance with:

$$I(x_k) = \sum_m w_m r(x_k, \alpha_m),$$

where $I(x_k)$ is the light sensing value of the image sensor to which the weight is selectively assigned, $r(x_k, \alpha_m)$ is the light sensing value sensed in the image sensor by light incident to a microlens $x_k$ from the direction $a_m$, $x_k$ is a two-dimensional (2D) coordinate with respect to the microlens, $a_m$ is the direction of the incident light, and $W_m$ is the weight representing an adjustment effect of an amount of the light incident according to the direction.

16. The method as claimed in claim 13, wherein the microlens array comprises a color filter configured to filter the light that is incident on the main lens.

17. The method as claimed in claim 13, wherein:
the digital iris is configured to assign a first weight to a light sensing value of light that is incident on an edge of the main lens; and
the digital iris is configured to assign a second weight, different from the first weight, to a light sensing value of light that is incident on a center of the main lens.

18. The method as claimed in claim 17, wherein the first weight is greater than the second weight.

19. The method as claimed in claim 13, wherein the digital iris is configured to assign weights so as to gradually increase from a light sensing value of light that is incident on an edge of the main lens to a light sensing value of light that is incident on a center of the main lens.

20. The method as claimed in claim 19, wherein the digital iris is configured to assign the weights so that a PSF forms a Gaussian bokeh.

21. A non-transitory computer-readable recordable medium having recorded thereon a program executable by hardware for performing the image generating method as claimed in claim 13.

22. The non-transitory recordable medium as claimed in claim 21, wherein the program is executable by that hardware that is a Complex Instruction Set Computer (CISC) chip, a Reduced Instruction Set Computer (RISC) chip, or a bit-slice Micro Processor Unit (MPU) chip.

23. A non-transitory computer-readable recordable medium having recorded thereon a program executable by hardware for performing the image generating method as claimed in claim 13.

* * * * *